United States Patent
Guo

(10) Patent No.: US 10,196,546 B2
(45) Date of Patent: Feb. 5, 2019

(54) FRAME SEALING ADHESIVE AND METHOD FOR PRODUCING THE SAME, DISPLAY PANEL AND METHOD FOR MANUFACTURING THE SAME, AND DISPLAY DEVICE

(71) Applicants: BOE Technology Group Co., Ltd., Beijing (CN); Hefei BOE Optoelectronics Technology Co., Ltd., Hefei (CN)

(72) Inventor: Wei Guo, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

(*) Notice: Subject to any disclaimer, the term of this patent is extended or adjusted under 35 U.S.C. 154(b) by 0 days.

(21) Appl. No.: 15/576,092

(22) PCT Filed: Apr. 21, 2017

(86) PCT No.: PCT/CN2017/081421
§ 371 (c)(1),
(2) Date: Nov. 21, 2017

(87) PCT Pub. No.: WO2017/186057
PCT Pub. Date: Nov. 2, 2017

(65) Prior Publication Data
US 2018/0127623 A1    May 10, 2018

(30) Foreign Application Priority Data
Apr. 27, 2016  (CN) .......................... 2016 1 0270002

(51) Int. Cl.
C09J 11/04    (2006.01)
G02F 1/1339    (2006.01)
(Continued)

(52) U.S. Cl.
CPC ............. *C09J 11/04* (2013.01); *C09J 163/00* (2013.01); *G02F 1/1339* (2013.01); *C08K 9/02* (2013.01);
(Continued)

(58) Field of Classification Search
CPC ................................ G02F 1/1339; C09J 11/04
See application file for complete search history.

(56) References Cited

U.S. PATENT DOCUMENTS

2014/0335290 A1*  11/2014  Zhang ................... G02F 1/1339
428/1.55

FOREIGN PATENT DOCUMENTS

| CN | 1261303 A | 7/2000 |
| CN | 102343239 A | 2/2012 |

(Continued)

OTHER PUBLICATIONS

International Search Report and Written Opinion and English Translation of International Search Report and Written Opinion from International Patent Application No. PCT/CN2017/081421, dated Jul. 27, 2017, 20 pages.
(Continued)

*Primary Examiner* — Joseph L Williams
(74) *Attorney, Agent, or Firm* — Westman, Champlin & Koehler, P.A.

(57) ABSTRACT

Embodiments of the present disclosure provide a frame sealing adhesive, a method for producing a frame sealing adhesive, a display panel, a method for manufacturing a display panel, and a display device. The frame sealing adhesive includes: a host adhesive material; and glass fibers having thermally conductive layers formed on their surfaces, wherein a thermal conductivity of the thermally conductive layers is greater than a thermal conductivity of the glass fibers.

20 Claims, 2 Drawing Sheets

(51) Int. Cl.
*C09J 163/00* (2006.01)
*C08K 9/02* (2006.01)

(52) U.S. Cl.
CPC ... *C08K 2201/001* (2013.01); *C09J 2203/318* (2013.01)

(56) References Cited

FOREIGN PATENT DOCUMENTS

| | | |
|---|---|---|
| CN | 102637584 A | 8/2012 |
| CN | 102643393 A | 8/2012 |
| CN | 102681262 A | 9/2012 |
| CN | 103342976 A | 10/2013 |
| CN | 103571156 A | 2/2014 |
| CN | 103937426 A | 7/2014 |
| CN | 104118174 A | 10/2014 |
| CN | 104176949 A | 12/2014 |
| CN | 104195522 A | 12/2014 |
| CN | 105419230 A | 3/2016 |
| CN | 105419724 A | 3/2016 |
| CN | 105802565 A | 7/2016 |
| EP | 0981427 A1 | 3/2000 |
| WO | 9850211 A1 | 11/1998 |

OTHER PUBLICATIONS

First Office Action, including Search Report, for Chinese Patent Apllication No. 201610270002.1, dated Mar. 5, 2018, 10 pages.

\* cited by examiner

FRAME SEALING ADHESIVE AND METHOD FOR PRODUCING THE SAME, DISPLAY PANEL AND METHOD FOR MANUFACTURING THE SAME, AND DISPLAY DEVICE

CROSS-REFERENCE TO RELATED APPLICATION

This application is a Section 371 National Stage Application of International Application No. PCT/CN2017/081421, filed on Apr. 21, 2017, entitled "FRAME SEALING ADHESIVE AND METHOD FOR PRODUCING THE SAME, DISPLAY PANEL AND METHOD FOR MANUFACTURING THE SAME, AND DISPLAY DEVICE", which claims priority to Chinese Patent Application No. 201610270002.1 filed on Apr. 27, 2016 with SIPO, incorporated herein by reference in entirety.

BACKGROUND

Technical Field

Embodiments of the present disclosure relate to a field of display technology, and more particularly, to a frame sealing adhesive, a method for producing a frame sealing adhesive, a display panel, a method for manufacturing a display panel, and a display device.

Description of the Related Art

In the current display field, in a manufacturing process of a display panel, a first substrate and a second substrate are generally manufactured by separate processes, and then the two substrates are aligned and assembled. A quick dripping assembling process is typically used to implement the assembling, a frame sealing adhesive is coated to assemble the two substrates, and then the two substrates are bonded to each other by a heat curing process.

SUMMARY

A frame sealing adhesive, including:
a host adhesive material; and
glass fibers having thermally conductive layers formed on their surfaces, wherein a thermal conductivity of the thermally conductive layers is greater than a thermal conductivity of the glass fibers.

Optionally, the glass fibers having the thermally conductive layers formed on their surfaces are glass fibers having graphene formed on their surfaces.

Optionally, a ratio of a mass of the host adhesive material to a mass of the glass fibers having the graphene formed on their surfaces is in a range of 100:1 to 100:5.

Optionally, the graphene occupies 3% to 7% in weight of the glass fibers having the graphene formed on their surfaces.

A method for producing a frame sealing adhesive, including steps of:
forming thermally conductive layers on surfaces of glass fibers;
obtaining a host adhesive material and the glass fibers having the thermally conductive layers formed on their surfaces in a predetermined weight ratio by weighing; and
mixing and stirring the host adhesive material and the glass fibers having the thermally conductive layers formed on their surfaces uniformly, and implementing a vacuum defoamation to them.

Optionally, the step of forming the thermally conductive layers on the surfaces of the glass fibers includes steps of:
weighing the glass fibers and putting glass fibers having a certain mass into a crucible, and heating the glass fibers so that the glass fibers are melted into glass liquid at a first temperature;
introducing methane gas and hydrogen gas into the glass liquid and heating them to a second temperature for a predetermined time; and
making the glass fibers having graphene formed on their surfaces from the glass liquid by a drawing process.

Optionally, the first temperature is in a range of 700 to 900° C., the second temperature is in a range of 1000 to 1300° C., and a ratio of molar concentration of the hydrogen gas to the methane gas is in a range of 1:99 to 1:3.

A method of manufacturing a display panel, including steps of:
coating the frame sealing adhesive according to any one of the above technical solutions on frame regions of a first substrate and/or a second substrate;
assembling the first substrate and the second substrate which have been coated with the frame sealing adhesive together, and
heating and curing the frame sealing adhesive.

A display panel, manufactured by the method according to claim 8.

A display device, including the display panel according to claim 9.

DETAILED DESCRIPTION OF PREFERRED EMBODIMENTS

A frame sealing adhesive, a method for producing a frame sealing adhesive, a display panel, a method for manufacturing a display panel, and a display device according to the present disclosure will be described in more detail with reference to the accompanying drawings and embodiments.

In the related art, there is a frame sealing adhesive which includes a host adhesive material and glass fibers which functions to support. In the heat curing process of the frame sealing adhesive, it often causes an incomplete curing reaction of curing agent and epoxy resin, resulting in that the two substrates in the display panel are not firmly bonded and a product yield is reduced.

Embodiments of the present disclosure are intended to provide a frame sealing adhesive, a method for producing a frame sealing adhesive, a display panel, a method for manufacturing a display panel, and a display device, so as to at least partially alleviate the problem that the two substrates in the display panel are not firmly bonded and thereby the product yield is reduced due to the incomplete curing reaction of the frame sealing adhesive.

Figure 4:
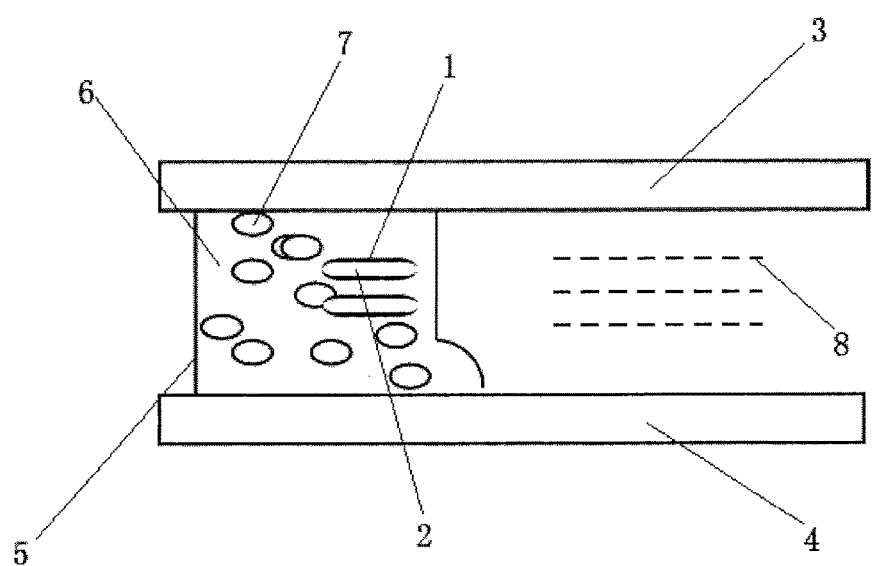
FIG. 4 is a schematic structural view of a display panel according to an embodiment of the present disclosure.

As shown in FIG. 4, an embodiment of the present disclosure provides a frame sealing adhesive 5, including a host adhesive material 6 and glass fibers 2 having thermally conductive layers 1 formed on their surfaces. The glass fibers 2 may be disposed in the host adhesive material 6.

Figure 1:
FIG. 1 is a schematic structural view of a glass fiber having a thermally conductive layer formed on its surface according to an embodiment of the present disclosure.

As shown in FIG. 1, the thermally conductive layer 1 is located on the surface of the glass fiber 2.

A thermal conductivity of the thermally conductive layers is greater than a thermal conductivity of the glass fibers.

In the embodiment of the present disclosure, since the thermally conductive layers 1 are formed on the surfaces of the glass fibers 2 contained in the frame sealing adhesive 5, during a curing process of the frame sealing adhesive 5, it facilitates quickening the melting of curing agent 7 in the frame sealing adhesive 5, allows the frame sealing adhesive 5 to implement a complete curing reaction, improves curing efficiency and curing effect, thereby improving adhesive strength of the frame sealing adhesive 5 and thus improving product yield.

The host adhesive material 6 includes curing agent 7, or further includes other materials, such as epoxy resin, and the like.

Optionally, the glass fibers having thermally conductive layers formed on their surfaces are glass fibers having graphene formed on their surfaces.

Optionally, a ratio of a mass of the host adhesive material to a mass of the glass fibers having graphene formed on their surfaces is in a range of 100:1 to 100:5.

Optionally, the graphene occupies 3% to 7% in weight of the glass fibers having graphene formed on their surfaces.

In this way, since the graphene is located on the glass fiber, it can be more evenly distributed inside the frame sealing adhesive, and since the glass fiber is taken as a carrier, the graphene has a higher specific surface area, a better thermal conductivity.

Figure 2:
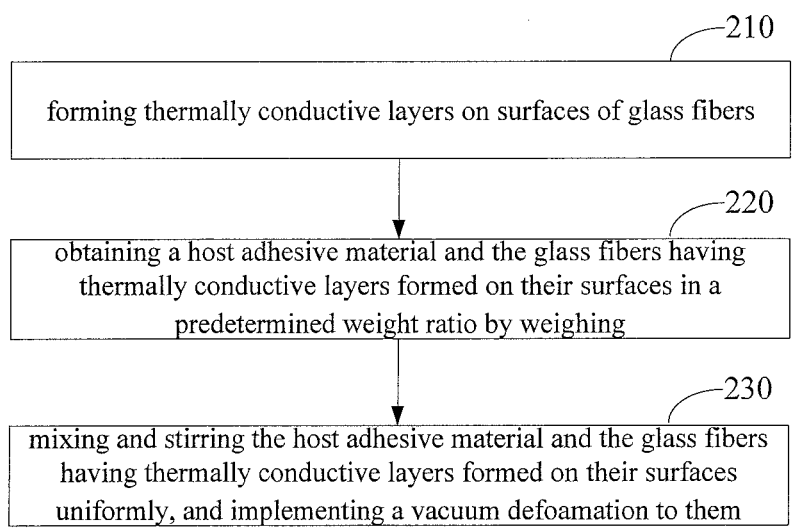
FIG. 2 is a flow chart of a method for producing a frame sealing adhesive according to an embodiment of the present disclosure.

In the above related embodiments, it only illustrates the glass fibers having thermally conductive layers by means of examples, however the glass fibers having thermally conductive layers are not limited to the specific examples. For example, in the case where a certain process condition can be achieved, the above-described glass fibers having thermally conductive layers may be glass fibers having carbon nanotubes or graphite formed on their surfaces Based on the same inventive concept, an embodiment of the present disclosure can also provides a method for producing a frame sealing adhesive, as shown in FIG. 2. The method at least includes steps of:

Step 210: forming thermally conductive layers on surfaces of glass fibers;

Step 220: obtaining a host adhesive material and the glass fibers having thermally conductive layers formed on their surfaces in a predetermined weight ratio by weighing; and Step 230: mixing and stirring the host adhesive material and the glass fibers having thermally conductive layers formed on their surfaces uniformly, and implementing a vacuum defoamation to them.

In the embodiment of the present disclosure, since the thermally conductive layers are formed on the surfaces of the glass fibers contained in the frame sealing adhesive, during a curing process of the frame sealing adhesive, it facilitates quickening the melting of curing agent in the frame sealing adhesive, allows the frame sealing adhesive to implement a complete curing reaction, improves curing efficiency and curing effect, thereby improving adhesive strength of the frame sealing adhesive and thus improving product yield.

Based on the frame sealing adhesive according to the above embodiments, specifically, the above-described glass fibers having thermally conductive layers formed on their surfaces may be glass fibers having graphene formed on their surfaces. Accordingly, in the step 210, the step of forming the thermally conductive layers on the surfaces of the glass fibers may be carried out by:

weighing the glass fibers and putting glass fibers having a certain mass into a crucible, and heating the glass fibers so that the glass fibers are melted into glass liquid at a first temperature;

introducing methane gas and hydrogen gas into the glass liquid and heating them to a second temperature for a predetermined time; and making the glass fibers having graphene formed on their surfaces from the glass liquid by a drawing process.

The methane is decomposed into carbon atoms at high temperature, and then the carbon atoms directly grow on the surface of the glass liquid to form the grapheme. The hydrogen gas promotes the growth of the graphene.

Optionally, the first temperature is in a range of 700 to 900° C., the second temperature is in a range of 1000 to 1300° C., and a ratio of molar concentration of the hydrogen gas to the methane gas is in a range of 1:99 to 1:3.

Optionally, the first temperature is 700° C., and the second temperature is 1000° C.

Optionally, a preset time for the heating at the second temperature may be in a range of 6 h to 10 h. In an example, the preset time is 8 h.

Optionally, the graphene occupies 3% to 7% in weight of the glass fibers having graphene formed on their surfaces.

Optionally, in the step 220, a ratio of a mass of the host adhesive material to a mass of the glass fibers having graphene formed on their surfaces is in a range of 100:1 to 100:5.

Based on the same inventive concept, an embodiment of the present disclosure can also provides a method of manufacturing a display panel, including steps of:

coating the frame sealing adhesive according to any one of the above embodiments on frame regions of a first substrate 3 and/or a second substrate 4;

assembling the first substrate and the second substrate which have been coated with the frame sealing adhesive together, and heating and curing the frame sealing adhesive.

Based on the same inventive concept, an embodiment of the present disclosure can also provides a display panel, manufactured by the method according to the above embodiments.

Next, a specific application is taken as an example, to describe a frame sealing adhesive, a method for producing a frame sealing adhesive, a display panel, a method for manufacturing a display panel, and a display device according to an embodiment of the present disclosure in more detail.

In this embodiment, a frame sealing adhesive including the host adhesive material and glass fibers having graphene formed on their surfaces is taken as an example.

Step 1: forming graphene on surfaces of glass fibers. In particular, glass fibers having a certain mass are weighted and put into a clean crucible, then the crucible is placed in a high-temperature tube furnace and heated to 700° C., so that the glass fibers are in a melted state, that is, glass liquid; methane gas and hydrogen gas are continuously introduced into the tube furnace, and the temperature is increased to 1000° C. and kept for 8 h; in this process, the methane is decomposed into carbon atoms at high temperature, and then the carbon atoms directly grow on the surface of the glass liquid to form the grapheme; the glass liquid having grapheme formed on its surface undergoes a high-speed glass drawing process to form glass fibers having graphene formed on their surfaces.

In this step, a ratio of molar concentration of the hydrogen gas to the methane gas is in a range of 1:99 to 1:3.

According to this step, the graphene occupies 3% to 7% in weight of the glass fibers having graphene formed on their surfaces.

Step 2: placing a host adhesive material and the glass fibers having thermally conductive layers formed on their surfaces in a predetermined weight ratio into a container for frame sealing adhesive, and mixing and stirring them.

In this step, a ratio of a mass of the host adhesive materials to a mass of the glass fibers having graphene formed on their surfaces may be 100:1, 100:3, or 100:5, and accordingly, the stirring time is 5 min, 7 min, or 10 min, respectively.

Step 3: filling the stirred frame sealing adhesive into an injector for frame sealing adhesive.

Step 4: placing the injector filled with the frame sealing adhesive in a vacuum defoaming machine, further stirring the frame sealing adhesive and implementing a vacuum defoameration in the vacuum defoaming machine.

The air pressure in the vacuum defoaming machine is 80 Pa or less, and the revolution speeds corresponding to weight ratios listed in the step 2 are 1800 rpm, 1600 rpm and 1500 rpm, respectively, and the defoaming times are 3 h, 3.5 h and 4 h, respectively.

Step 5: assembling the injector filled with the frame sealing adhesive into a coating device for frame sealing adhesive.

Step 6: coating the frame sealing adhesive on frame regions of a first substrate and/or a second substrate by means of the coating device for frame sealing adhesive in the step 5.

Herein, the first substrate may be a TFT array substrate, and the second substrate may be a color filter substrate.

Step 7: assembling the first substrate and the second substrate which have been coated with the frame sealing adhesive together.

Step 8: heating and curing the frame sealing adhesive.

In the display panel manufactured through the above steps, the curing reaction of the frame sealing adhesive is more complete, the bonding strength between the first substrate and the second substrate is greatly improved. If the display panel is a liquid crystal display panel (as shown in FIG. 4), it can effectively prevent liquid crystal 8 from leaking and prevent external environment from polluting the liquid crystal 8, improving the product yield.

Figure 3:
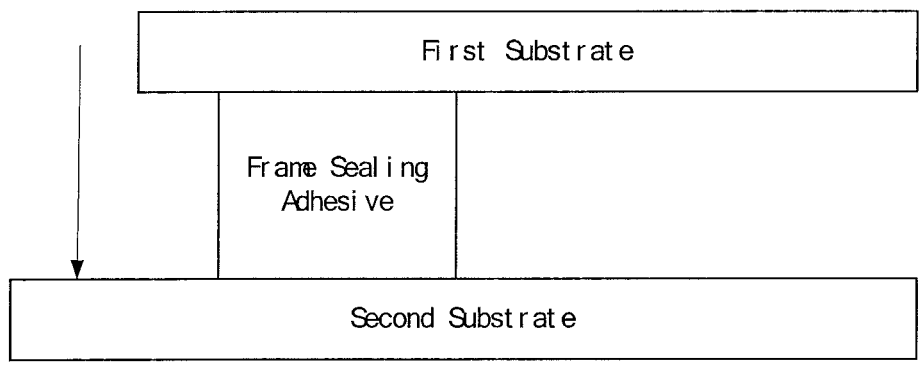
FIG. 3 is a schematic test chart showing a pressure required for peeling off substrates from a frame sealing glue in an embodiment of the present disclosure.

In order to more clearly embody advantageous effects of this embodiment, a frame sealing adhesive containing the glass fibers is used to obtain a display panel under the same process, and this display panel is compared with the above-described display panel which is obtained using a frame sealing adhesive containing glass fibers having graphene formed on their surfaces. In particular, using a frame sealing adhesive, in which a ratio of a mass of the host adhesive material to a mass of the glass fibers having graphene formed on their surfaces is 100:3, to obtain five display panels; and using a frame sealing adhesive containing the glass fibers to obtain five display panels under the same process;

implementing the following tests to the obtained display panels: the display panels are clamped by glass test fixtures and placed on a worktable, as shown in FIG. 3, a pressure head is pressed onto the TFT array substrate side or the color filter substrate side at a speed of 5 mm/min (as indicated by arrows in the figure) until the substrate is peeled off from the frame sealing adhesive, and then the used pressure is measured.

As for the five obtained display panels having a frame sealing adhesive containing glass fibers having graphene formed on their surfaces and the five obtained display panels having a frame sealing adhesive containing the glass fibers, the pressure required for peeling off the substrate from the frame sealing adhesive is measured, as shown in table 1.

TABLE 1

| pressure required for peeling off substrate from frame sealing adhesive | | | | | |
|---|---|---|---|---|---|
| For display panels having a frame sealing adhesive containing the glass fibers, the measured pressure (N) required for peeling off the substrate from the frame sealing adhesive | 19.2 | 18.9 | 19.6 | 19.4 | 20.1 |
| For display panels having a frame sealing adhesive containing glass fibers having graphene formed on their surfaces, the measured pressure (N) required for peeling off the substrate from the frame sealing adhesive | 22.6 | 23.1 | 22.8 | 23.2 | 22.3 |

As can be seen from Table 1, as to the display panels having a frame sealing adhesive containing glass fibers having graphene formed on their surfaces, the pressure required for peeling off the substrate from the frame sealing adhesive is relatively large, indicating that the curing effect of the frame sealing adhesive is good and the bonding strength is higher.

Based on the same inventive concept, an embodiment of the present disclosure can also provides a display device, including the display panel according to any one of the above embodiments.

In the frame sealing adhesive, the method for producing the frame sealing adhesive, the display panel, the method for manufacturing the display panel, and the display device, since the thermally conductive layers are formed on the surfaces of the glass fibers contained in the frame sealing adhesive, during a curing process of the frame sealing adhesive, it facilitates quickening the melting of curing agent in the frame sealing adhesive, allows the frame sealing adhesive to implement a complete curing reaction, improves curing efficiency and curing effect, thereby improving adhesive strength of the frame sealing adhesive and thus improving product yield.

While alternative embodiments of the present disclosure have been described, those skilled in the art will be able to make further changes and modifications to these embodiments once the basic inventive concept is known. Accordingly, the appended claims are intended to be interpreted as including all alternative embodiments and modifications that fall within the scope of the present disclosure.

It will be apparent to those skilled in the art that various changes and modifications can be made to the present disclosure without departing from the spirit and scope of the present disclosure. Thus, the present disclosure is intended to include the changes and modifications of the present disclosure if such changes and modifications are within the scope of the claims and the equivalents thereof.

What is claimed is:

1. A frame sealing adhesive, comprising:
   a host adhesive material; and glass fibers having thermally conductive layers formed on their surfaces, wherein a thermal conductivity of the thermally conductive layers is greater than a thermal conductivity of the glass fibers.

2. The frame sealing adhesive according to claim 1, wherein the glass fibers having the thermally conductive layers formed on their surfaces are glass fibers having graphene formed on their surfaces.

3. The frame sealing adhesive according to claim 2, wherein a ratio of a mass of the host adhesive material to a mass of the glass fibers having the graphene formed on their surfaces is in a range of 100:1 to 100:5.

4. The frame sealing adhesive according to claim 2, wherein the graphene occupies 3% to 7% in weight of the glass fibers having the graphene formed on their surfaces.

5. A method for producing a frame sealing adhesive, comprising steps of:
   forming thermally conductive layers on surfaces of glass fibers;
   obtaining a host adhesive material and the glass fibers having the thermally conductive layers formed on their surfaces in a predetermined weight ratio by weighing; and
   mixing and stirring the host adhesive materials and the glass fibers having the thermally conductive layers formed on their surfaces uniformly, and implementing a vacuum defoamation to them.

6. The method according to claim 5, wherein the step of forming the thermally conductive layers on the surfaces of the glass fibers comprises steps of:
   weighing the glass fibers and putting glass fibers having a certain mass into a crucible, and heating the glass fibers so that the glass fibers are melted into glass liquid at a first temperature;
   introducing methane gas and hydrogen gas into the glass liquid and heating them to a second temperature for a predetermined time; and
   making the glass fibers having graphene formed on their surfaces from the glass liquid by a drawing process.

7. The method according to claim 6, wherein the first temperature is in a range of 700 to 900° C., the second temperature is in a range of 1000 to 1300° C., and a ratio of molar concentration of the hydrogen gas to the methane gas is in a range of 1:99 to 1:3.

8. A method of manufacturing a display panel, comprising steps of:
   coating the frame sealing adhesive according to claim 1 on frame regions of a first substrate and/or a second substrate;
   assembling the first substrate and the second substrate which have been coated with the frame sealing adhesive together; and
   heating and curing the frame sealing adhesive.

9. A display panel, manufactured by the method according to claim 8.

10. A display device, comprising the display panel according to claim 9.

11. The frame sealing adhesive according to claim 3, wherein the graphene occupies 3% to 7% in weight of the glass fibers having the graphene formed on their surfaces.

12. A method of manufacturing a display panel, comprising steps of:
   coating the frame sealing adhesive according to claim 2 on frame regions of a first substrate and/or a second substrate;
   assembling the first substrate and the second substrate which have been coated with the frame sealing adhesive together; and
   heating and curing the frame sealing adhesive.

13. A method of manufacturing a display panel, comprising steps of:
   coating the frame sealing adhesive according to claim 3 on frame regions of a first substrate and/or a second substrate;
   assembling the first substrate and the second substrate which have been coated with the frame sealing adhesive together; and
   heating and curing the frame sealing adhesive.

14. A method of manufacturing a display panel, comprising steps of:
   coating the frame sealing adhesive according to claim 4 on frame regions of a first substrate and/or a second substrate;
   assembling the first substrate and the second substrate which have been coated with the frame sealing adhesive together; and
   heating and curing the frame sealing adhesive.

15. A display panel, manufactured by the method according to claim 12.

16. A display device, comprising the display panel according to claim 15.

17. A display panel, manufactured by the method according to claim 13.

18. A display device, comprising the display panel according to claim 17.

19. A display panel, manufactured by the method according to claim 14.

20. A display device, comprising the display panel according to claim 19.

* * * * *